United States Patent Office 3,297,797
Patented Jan. 10, 1967

3,297,797
SYMMETRICAL S,S-DIALKYL ESTERS OF DI-
ALKYL THIOPYROPHOSPHORUS ACIDS
Thomas Mason Melton, Richmond, Va., assignor to
Mobil Oil Corporation, a corporation of New York
No Drawing. Filed Sept. 16, 1963, Ser. No. 309,316
6 Claims. (Cl. 260—933)

This invention relates to and has for its object new organophosphorus insecticidal compositions. More particularly, the present invention concerns compounds of the formula

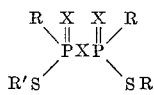

wherein R and R' are alkyls of from 1 to 4 carbon atoms, and X is oxygen or sulfur.

PREPARATION OF THE COMPOUNDS, GENERALLY

The preferred method for preparing the compounds of this invention is well known. See Kosolapoff, Organophosphorus Compounds, sec. XIV, page 343 (1958). When a compound having an oxygen bridge between the two phosphorus atoms is desired, it may be obtained by reacting substantially two moles of an S-alkyl alkylphosphonohalidodithioate or an S-alkyl alkylphosphonohalidothioate, wherein the alkyl has from 1 to 4 carbon atoms, with substantially one mole of water, using two moles of an organic amine, such as pyridine or triethylamine, as the halogen acid acceptor. As pointed out in the reference cited, solvents are not essential, but they may be used. In the practice of this invention, solvents, such as hexane, are preferred.

Compounds having sulfur as a bridge between the two phosphorus atoms may be obtained by using a method similar to the above, substituting, however, hydrogen sulfide for water.

Preparation of these two types of compounds having different bridging atoms between the phosphorus atoms may be illustrated by the following:

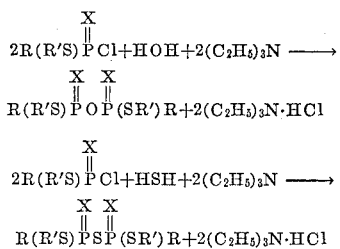

UTILITY AND FORMULATIONS

As stated previously, the compounds of this invention are insecticides. As used herein, the term "insecticide" will be understood to encompass the use of the claimed chemicals against spiders, mites, ticks, and similar pests which are not, biologically speaking, insects.

The new compounds are effective as insecticides within the range of about 0.01% to about 0.3% of the total weight of formulation used. It is contemplated, however, that under ideal conditions the amount may be less than the lowest stated rate. Furthermore, while 0.3% will generally be adequate for complete control, it may be that certain conditions, such as adverse weather, resistance of the pest and the like, will require a higher rate of application. This range, therefore, is not to be controlling, since it is merely a statement of the preferred range.

The compounds may be used as the sole agent in insecticidal formulations, or they may be used in conjunction with other toxicants. They may be made into insecticidal compositions by diluting with solid carriers such as fertilizers, talc, bentonite, attapulgite and the like, by dispersing in an organic solvent, or in water, or in a combination of water and solvent. The organic solvent used is preferably one which will evaporate quickly from any plants which are to be treated, or if not volatile, will not be phytotoxic to the plant. The aqueous dispersions may contain a surface active agent such as Tween-20 (polyoxyethylene sorbitan monolaurate), which will have the advantages of providing emulsification and of aiding in spreading the active material more uniformly over the plant surface.

In using the chemicals of this invention against agricultural pests the aqueous dispersion or solution will ordinarily be made up from a concentrate composed substantially of the compound and at least about 1%, based upon the weight of the active ingredient, of the surface active agent. The concentrate will be dispersed in water, or in water containing an inert organic solvent, to the extent necessary to give the desired concentration.

Solid formulations may be prepared by mixing the active ingredient and a granular or finely divided solid in such proportions as to give the desired concentration. Since, however, the active component is used in such small quantities, a formulation containing a more uniformly distributed active component can be obtained by (1) dissolving the desired quantity of compound in acetone or other solvent which can be readily evaporated, (2) mixing the solid with the solvent-active ingredient mixture, and then (3) evaporating the solvent.

SPECIFIC ILLUSTRATIONS

The following examples will illustrate the preparation of the compounds of this invention. "Parts" are parts by weight unless otherwise stated.

Example 1

PREPARATION OF O-(S-PROPYL METHYLPHOSPHONO-
THIOYL) S-PROPYL METHYLPHOSPHONODITHIOATE

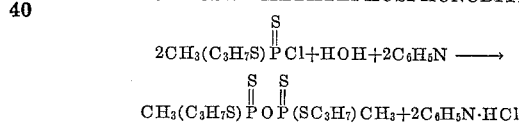

Eighteen and nine-tenths parts of S-propyl methylphosphonochloridodithioate and about 70 parts of hexane were placed in a suitable reaction vessel. A mixture 0.9 part of water and 7.9 parts of pyridine was added with stirring to the solution in the reaction vessel. The addition required 10 minutes at 25° C. There was a slight rise in temperature, but not enough to indicate any appreciable reaction. The reaction mixture was brought to reflux temperature (68° C.), and was held there for 2 hours. The contents of the reaction vessel were cooled, the pyridine hydrochloride was removed, and the solvent was distilled to a final pot temperature of 60° C. and a final pressure of 40 mm. of Hg. Distillation gave 67.3% of the product boiling at 142–150° C. at 0.2 mm. of Hg. The product had the following additional properties:

Refractive index at 27° C. _____ 1.5755
Density at 20°/4° C. _____ 1.205

Percent P (calc.) 19.2; percent P (found) 19.69.

Example 2

PREPARATION OF S-(S-PROPYL METHYLPHOSPHONO-
THIOYL) S-PROPYL METHYLPHOSPHONOTRITHIOATE

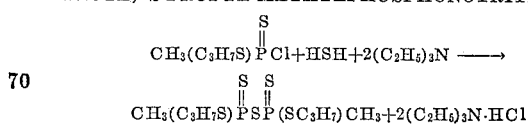

Eighteen and nine-tenths parts of S-propyl methylphosphonochloridodithioate, 10.1 parts of triethylamine and about 70 parts of hexane were placed in a reaction vessel having, in addition to the usual stirring and temperature measuring means, a gas addition tube attached in such a manner that gas could be fed in beneath the surface of the liquid. The mixture was heated to reflux, and, while stirring vigorously, hydrogen sulfide was bubbled in. Refluxing and addition of the hydrogen sulfide was continued for 4 hours. The resulting mixture was filtered to remove the triethylamine hydrochloride and distilled to a pot temperature of 60° C. and a final pressure of 30 mm. of Hg. to remove the solvent. 28.6 parts of product was obtained having the following properties:

Refractive index at 29° C. _____ 1.5976
Density at 20°/4° C. _____ 1.178
Percent P (calc.) 18.27; percent P (found) 18.07.

The compounds of the following examples may be prepared as shown in Examples 1 and 2.

Example 3

O-(S-ethyl ethylphosphonyl) S-ethyl ethylphosphonothioate of the formula

from

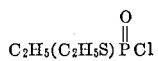

and water.

Example 4

S-(S-butyl propylphosphonyl) S-butyl propylphosphonodithioate of the formula

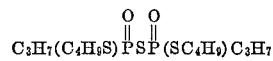

from

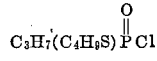

and hydrogen sulfide.

Example 5

O-(S-methyl butylphosphonothioyl) S-methyl butylphosphonodithioate of the formula

from

and water.

What is claimed is:

1. A compound of the formula

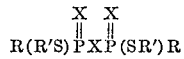

wherein R and R′ are alkyls of from 1 to 4 carbon atoms and X is a member of the group consisting of oxygen and sulfur.

2. 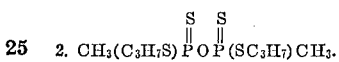

3. 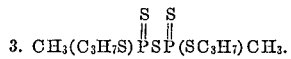

4. 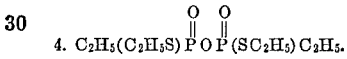

5. 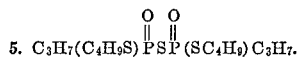

6. 

No references cited.

CHARLES B. PARKER, *Primary Examiner.*

F. M. SIKORA, *Assistant Examiner.*